United States Patent
Melton et al.

(10) Patent No.: US 7,751,339 B2
(45) Date of Patent: Jul. 6, 2010

(54) METHOD AND APPARATUS FOR SIMPLY CONFIGURING A SUBSCRIBER APPLIANCE FOR PERFORMING A SERVICE CONTROLLED BY A SEPARATE SERVICE PROVIDER

(75) Inventors: Roger Melton, Durham, NC (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1063 days.

(21) Appl. No.: 11/437,930

(22) Filed: May 19, 2006

(65) Prior Publication Data
US 2007/0268837 A1 Nov. 22, 2007

(51) Int. Cl.
*H04J 1/16* (2006.01)
(52) U.S. Cl. .............. 370/252; 370/395.2; 370/395.21
(58) Field of Classification Search .............. 370/250, 370/252, 254, 352, 449, 395.2, 395.21, 395.3; 713/153, 156, 185, 172, 182, 168, 173, 167, 713/165; 709/203, 225, 220, 226, 238, 224; 726/1, 2, 4, 5, 6, 9, 15, 26; 380/270, 30
See application file for complete search history.

(56) References Cited

U.S. PATENT DOCUMENTS

| | | | |
|---|---|---|---|
| 5,237,564 A | 8/1993 | Lespagnol et al. |
| 5,274,643 A | 12/1993 | Fisk |
| 5,305,311 A | 4/1994 | Lyles |
| 5,311,509 A | 5/1994 | Heddes et al. |
| 5,313,454 A | 5/1994 | Bustini et al. |
| 5,327,421 A | 7/1994 | Hiller et al. |
| 5,345,445 A | 9/1994 | Hiller et al. |
| 5,345,446 A | 9/1994 | Hiller et al. |
| 5,365,524 A | 11/1994 | Hiller et al. |
| 5,390,170 A | 2/1995 | Sawant et al. |
| 5,390,175 A | 2/1995 | Hiller et al. |
| 5,394,402 A | 2/1995 | Ross |
| 5,400,325 A | 3/1995 | Chatwani et al. |
| 5,408,469 A | 4/1995 | Opher et al. |
| 5,422,882 A | 6/1995 | Hiller et al. |
| 5,426,636 A | 6/1995 | Hiller et al. |

(Continued)

OTHER PUBLICATIONS

Cisco 6400 Access Concentrators, printed from http://www.cisco.com/warp/public/cc/pd/as/6400/index.shtml, printed from web archived copy of site saved Aug. 18, 2000.

(Continued)

*Primary Examiner*—Frank Duong
*Assistant Examiner*—Abdullah Riyami
(74) *Attorney, Agent, or Firm*—Stolowitz Ford Cowger LLP (57) ABSTRACT

A method and apparatus for configuring an appliance, such as a network node, for performing s service, such as communicating with a network, controlled by a service provider include inserting into an Ethernet port on the appliance an Ethernet couple on a device that is usually small compared to the appliance. The device is configured to send through the Ethernet couple without human intervention an Internet Protocol (IP) data packet that is directed to a logical port of an established standard, such as Hypertext Transfer Protocol (HTTP) port 80. The IP data packet includes appliance configuration data in a message form for the established standard, such as an HTTP POST. As a result, the appliance is configured automatically for performing the service controlled by the service provider.

27 Claims, 4 Drawing Sheets

U.S. PATENT DOCUMENTS

| | | | |
|---|---|---|---|
| 5,428,607 A | 6/1995 | Hiller et al. | |
| 5,430,715 A | 7/1995 | Corbalis et al. | |
| 5,452,297 A | 9/1995 | Hiller et al. | |
| 5,555,244 A | 9/1996 | Gupta et al. | |
| 5,583,862 A | 12/1996 | Callon | |
| 5,610,910 A | 3/1997 | Focsaneanu et al. | |
| 5,740,176 A | 4/1998 | Gupta et al. | |
| 5,742,604 A | 4/1998 | Edsall et al. | |
| 5,799,017 A | 8/1998 | Gupta et al. | |
| 5,864,542 A | 1/1999 | Gupta et al. | |
| 5,883,893 A | 3/1999 | Rumer et al. | |
| 5,953,336 A | 9/1999 | Moore et al. | |
| 6,028,867 A | 2/2000 | Rawson et al. | |
| 6,285,671 B1 | 9/2001 | Bossemeyer et al. | |
| 6,354,294 B1* | 3/2002 | Villareal, Jr. | 128/204.18 |
| 6,418,486 B1* | 7/2002 | Lortz et al. | 710/10 |
| 6,463,528 B1 | 10/2002 | Rajakarunanayake et al. | |
| 6,480,494 B1 | 11/2002 | Hawley | |
| 6,584,074 B1 | 6/2003 | Vasamsetti et al. | |
| 6,597,689 B1 | 7/2003 | Chiu et al. | |
| 6,748,532 B1* | 6/2004 | Digiorgio et al. | 713/159 |
| 6,766,454 B1* | 7/2004 | Riggins | 713/185 |
| 6,975,597 B1 | 12/2005 | Baker et al. | |
| 6,993,048 B1 | 1/2006 | Ah Sue | |
| 7,302,487 B2* | 11/2007 | Ylonen et al. | 709/229 |
| 7,392,309 B2* | 6/2008 | Childers et al. | 709/224 |
| 7,475,250 B2* | 1/2009 | Aull et al. | 713/173 |
| 2002/0191548 A1* | 12/2002 | Ylonen et al. | 370/254 |
| 2003/0018889 A1* | 1/2003 | Burnett et al. | 713/153 |
| 2004/0128392 A1* | 7/2004 | Blakley et al. | 709/229 |
| 2004/0199665 A1* | 10/2004 | Omar et al. | 709/238 |
| 2005/0108534 A1* | 5/2005 | Bajikar et al. | 713/172 |
| 2005/0123142 A1* | 6/2005 | Freeman et al. | 380/277 |
| 2005/0160306 A1* | 7/2005 | Okunseinde et al. | 714/3 |
| 2005/0246193 A1* | 11/2005 | Roever et al. | 705/1 |
| 2005/0268107 A1* | 12/2005 | Harris et al. | 713/182 |
| 2005/0273849 A1* | 12/2005 | Araujo et al. | 726/12 |
| 2006/0005011 A1* | 1/2006 | Satoh | 713/156 |
| 2006/0048212 A1* | 3/2006 | Tsuruoka et al. | 726/4 |
| 2006/0059548 A1* | 3/2006 | Hildre et al. | 726/9 |
| 2006/0136990 A1* | 6/2006 | Hinton et al. | 726/2 |
| 2007/0005736 A1* | 1/2007 | Hansen et al. | 709/220 |
| 2007/0061889 A1* | 3/2007 | Sainaney | 726/26 |
| 2007/0136799 A1* | 6/2007 | Brennan | 726/9 |
| 2007/0180509 A1* | 8/2007 | Swartz et al. | 726/9 |
| 2007/0198661 A1* | 8/2007 | Hansen | 709/219 |
| 2007/0245148 A1* | 10/2007 | Buer | 713/182 |
| 2007/0263552 A1* | 11/2007 | Mamakos | 370/254 |
| 2008/0049937 A1* | 2/2008 | Pauker et al. | 380/270 |
| 2008/0065887 A1* | 3/2008 | Grove et al. | 713/168 |
| 2008/0127316 A1* | 5/2008 | Golan et al. | 726/5 |
| 2008/0212771 A1* | 9/2008 | Hauser | 380/44 |
| 2008/0256232 A1* | 10/2008 | Fleury et al. | 709/224 |
| 2008/0263150 A1* | 10/2008 | Childers et al. | 709/203 |
| 2009/0064046 A1* | 3/2009 | Childers et al. | 715/835 |
| 2009/0259753 A1* | 10/2009 | Hinton et al. | 709/226 |
| 2009/0313368 A1* | 12/2009 | Hollebeek et al. | 709/223 |

OTHER PUBLICATIONS

Cisco 6400 Series Universal Access Concentrator, Data Sheet, http://www.cisco.com/warp/public/cc/pd/as/6400/ prodlit/6400_ds.htm, printed from web archived copy of site saved Aug. 18, 2000.

Cisco 6400 Universal Access Concentrator, Product Bulletin—No. 1120, printed from web archived copy of http://www.cisco.com/warp/public/cc/pd/as/6400/prodlit/1120_pp.htm saved Dec. 10, 2000.

Esaki, et al., "Datagram Delivery in an ATM-Internet", Mar. 1994, IEICE Trans. Commun., vol. E77-B, No. 3, pp. 314-326.

Layer 2 Tunnel Protocol, Release 12.0(1)T and 11.3(5)AA.

"L2TP", 1998, Mecklermedia Corporation, printed from http://webopedia.internet.com/TERM/L/L2TP/html, printed Nov. 9, 2009.

"MultiVPN from Ascend Communications: Breaking Down the Barriers to VPNs", Ascend Communications, Inc., White Paper, 1998.

Patel, B., et al., "Securing L2TP using IPSEC", May 1998, PPPEXT Working Group, pp. 1-10.

Valencia, et al., "Layer Two Tunneling Protocol L2TP", PPP Working Group, May 1998.

Stolowitz Ford Cowger LLP, Listing of Related Cases, Nov. 10, 2009.

\* cited by examiner

METHOD AND APPARATUS FOR SIMPLY CONFIGURING A SUBSCRIBER APPLIANCE FOR PERFORMING A SERVICE CONTROLLED BY A SEPARATE SERVICE PROVIDER

BACKGROUND OF THE INVENTION

1. Field of the Invention

The present invention relates to installing configuration data on a subscriber's appliance (such as a network node) for providing a service (such as communications with a network) controlled by a separate service provider different from the subscriber. In particular, the present invention replaces an error-prone manual configuration process with a simpler process using a portable hardware configuration device provided by the service provider.

2. Description of the Related Art

Networks of general purpose computer systems and other devices connected by external communication links are well known. The networks often include one or more network devices that facilitate the passage of information between the computer systems. A network node is a network device or computer system or other device connected by the communication links. As used herein, an end node is a node that is configured to originate or terminate communications over the network. In contrast, an intermediate network node facilitates the passage of data between end nodes.

Communications between nodes are typically effected by exchanging discrete packets of data. Information in a data packet is formatted according to one or more of many well known, new or still developing protocols. In this context, a "protocol" consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein. A common protocol used at the internetworking layer (Layer 3) is the Internet Protocol (IP).

With recent technological advances, various specialized and mobile devices have participated as end nodes in network communications and include, but are not limited to, wireless telephones, personal digital assistants (PDAs), electronic notebooks, household appliances, devices for human interface, Internet telephones and other devices capable of initiating or receiving voice, video or data communicated over a network. Some of these end nodes are arranged in local networks using one or more intermediate network nodes at the user's site. The local area networks (LANs) range in size and complexity. Many user LANs are configured as a small office/home office (SO/HO).

Communications with remote sites are accomplished by subscribing for service over a wide area network (WAN) of intermediate network nodes maintained by a service provider different from the local user. Such service usually requires that one or more network nodes at the user site be configured for communication with one or more intermediate network nodes of the service provider. The network nodes that are connected to the service provider network and configured for WAN communications between different remote LANs are called network appliances herein. Any number and type of network node may serve as a network appliance in this context. For example, network appliances include, but are not limited to, routers, firewalls, wireless access points, bridges, voice over IP (VoIP) telephones, and VoIP adapters. The configuration data can specify any number of parameters that described the communications between the user site and the service provider site. At a minimum, the configuration data indicates an account number, such as a user identifier (ID), and a password provided by the service provider when the user subscribes to the service and arranges for payment.

For complex and expensive systems, such as those managed by the service provider, there are automated mechanisms for providing configuration data, such as an exchange of messages using the Simple Network Management Protocol (SNMP). However, such automated systems are rarely found in residential and SO/HO network nodes.

Typically, a process to configure SO/HO nodes for access to a service provider network is a manual process performed by a human user who is or acts for the subscriber of the service. The process is manual whether the human user is left alone (unguided), provided with a printed or electronic document (guided), or prompted for information by a program running on a computer connected to the network appliance (interactive). Thus the human user can make an error in entering the account number or password or other required information, and the configuration can fail. In many situations, to avoid the errors often committed by a novice user of network equipment, the service provider sends a technician to the subscriber's premises to wire communication links with the service provider equipment and configured the subscriber's network appliance(s).

While suitable for many SO/HO uses, there are disadvantages to the manual configuration of such network appliances. One disadvantage is that the cost to the service provider is increased when a technician is required to visit subscriber sites. Another disadvantage is that subscription revenues are lost during a time interval between a first time when the subscriber purchases the network appliance and a later time when the technician arrives to configure the network appliance. Another disadvantage incurs even when a technician is not used, but instead the subscriber configures the network appliance alone. Because of the manual data entry, an error can be introduced. The error often leads to a failed configuration. The failed configuration leads to service calls requiring technician time over a telephone or on site, and also to loss of subscription revenue in the time between when the subscriber first attempts configuration until the configuration is successful. The dependence on manual entry also sometimes leads to limits in the complexity of passwords attempted, further leading to reduced security.

Based on the foregoing description, there is a clear need for techniques that configure network appliances that do not suffer all the disadvantages of prior art approaches. In particular, there is a need to automate the configuration process for network appliances deployed in a SO/HO arrangement so that less manually input information is required.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for configuring an appliance at a subscriber site for performing a service controlled by a service provider different from the subscriber. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of a portable device called a hardware configuration token (HCT) for configuring a network appliance, such as a VoIP adapter, with multiple physical network interfaces as found in a small office that constitutes a customer site, using the hypertext Transfer Protocol (HTTP). However, the invention is not limited to this context. In other embodiments, larger or smaller devices, with the same or different names, for configuring one or more of the same or different network and non-network appliances, using HTTP or other application layer protocols, such as SNMP, in a larger or smaller local area network are provided with configuration data that for some reason, e.g., security or copyright, is not configured at the point of purchase In general, the appliance to be configured is known to a service provider that enables the device to perform its function and thereby provide the service. The device is purchased by the subscriber and the configuration data for the appliance is furnished by the service provider on a device that plugs into a network interface port on the appliance. Most network appliances already come with one or more network interfaces, including one or more Ethernet network interfaces. The device exports data in a way that the appliance expects the data to be provided, whether actually provided manually by a human user or not. Most network appliances maintain a World Wide Web (Web) server using the HyperText Transfer Protocol (HTTP) that expects configuration data to be provided in an HTTP "POST" command string. Thus, in the illustrated embodiment, the configuration data is exported from the device to the appliance in an HTTP POST command.

An advantage of the illustrated embodiment is that the network appliance does not need to be modified in any way. As far as the network appliance is concerned, a savvy human user has just entered and submitted the correct information into a client on a computer connected to the Ethernet port, and the client has sent the information to a server on the network appliance through the Ethernet link, as in the conventional approaches for network appliances.

In other embodiments, especially for non-network appliances, some modifications are anticipated; e.g., an Ethernet interface card is added to a non-network appliance and a processor on the appliance is programmed with a server to accept input through the Ethernet link.

1.0 Network Overview

Communications between nodes in a network are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

The client-server model of computer process interaction is also widely known and used. According to the client-server model, a client process sends a message including a request to a server process, and the server process responds by providing a service. The client and server typically operate at the application layer (layer 7) of the OSI model. The server process may also return a message with a response to the client process. Often the client process and server process execute on different devices, called hosts, and communicate via a network using one or more lower layer protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy.

Figure 1:
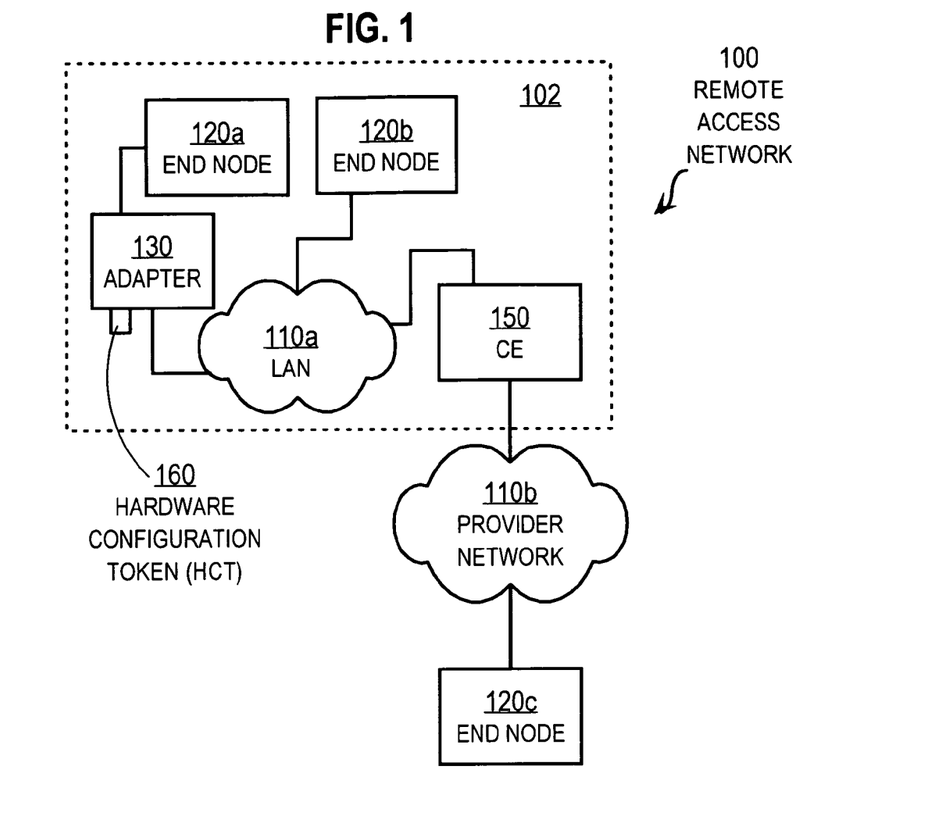
FIG. 1 is a block diagram that illustrates a subscriber's network appliance for remote access to a provider network, according to an embodiment.

FIG. 1 is a block diagram that illustrates a remote access network 100 that includes a subscriber's network appliance for remote access to a provider network, according to an embodiment. The network 100 includes a provider network 110b and end node 120c. At a subscriber's premises 102, the network 100 includes a local area network (LAN) 110a connected to one or more local network nodes, including end nodes 120a, 120b, VoIP adapter 130 and customer premises edge (CE) node 150.

A computer network is a geographically distributed collection of interconnected sub-networks (e.g., sub-networks 110a, 110b, collectively referenced hereinafter as sub-networks 110) for transporting data between nodes, such as computers and IP telephones. A local area network (LAN) 110a at subscriber premises 102 is an example of such a sub-network. The network's topology is defined by an arrangement of end nodes (e.g., end nodes 120a, 120b, 120c, collectively referenced hereinafter as end nodes 120) that communicate with one another, typically through one or more intermediate network nodes, such as a router or switch, that facilitates routing data between end nodes 120 on different sub-networks. In the illustrated embodiment, the end node 120b is an IP telephone that delivers voice in perceptible real-time using IP as a lower layer protocol. Intermediate network nodes depicted in FIG. 1 include CE 150 and VoIP adapter 130. The VoIP adapter 130 allows a regular telephone to be used as end node 120a and converts between voice signals on telephone cable connected to end node 120a and VoIP on LAN 110a.

To access provider network 110b, LAN 110a is connected to CE 150 which serves as a bridge to provider network 110b. In an illustrated embodiment, LAN 110a uses Ethernet infrastructure. Although the remote site 102 includes an Ethernet LAN 110a and two end nodes 120a, 120b, in other embodiments more or fewer end nodes 120 are connected to more or fewer or different LANs 110, such as one or more LANs using Asynchronous Transfer Mode (ATM) infrastructure.

In some embodiments, CE 150 is a telephone modem using acoustic frequency electronic signals over a low-bandwidth legacy telephone system. In some embodiment, CE 150 is a digital subscriber line (DSL) modem for establishing a high bandwidth DSL connection over the telephone wire network as the last mile of provider network 110b. In some embodiments CE 150 is a set top box (STB) that receives signals from a cable last mile of provider network 110b and selects a signal to display on a television set or to record on an analog or digital video recorder.

In an illustrated embodiment, CE 150 is a cable modem for establishing a high bandwidth cable connection over a coaxial cable network segment as the last mile of provider network 110b. In other embodiments, CE 150 is an optical modem or wireless network interface card for establishing a high bandwidth optical or wireless connection to provider network 110b. In an illustrated embodiment, the protocol used for communications over provider network 110b is IP.

One or more of the local network nodes purchased by the subscriber and installed at subscriber premises 102 must be configured to operate with provider network 110b. Other customers may purchase similar equipment for use with networks of other service providers. To work with a particular service provider who operates network 110b, the configuration data should include a user account established by the subscriber with the service provider and a shared secret password for security. As described above for conventional approaches, the service provider that operates provider network 110b sends the user account and password information, at least, out of band (not over network 110b) to the subscriber. The subscriber then configures one or more of the local network nodes with this information, so that the local network node can properly establish communications with the provider network 110b. As pointed out for the conventional approaches with SO/HO LANs, the configuration process is manual, error-prone and costly.

As described in more detail below, according to some embodiments of the invention, a network appliance, such as end node 120, adapter 130, an intermediate network node in LAN 110a, or CE 150, is configured for service over provider network 110b using a separate hardware device, called herein a hardware configuration token (HCT), which involves only a simple unskilled human manipulation. In the illustrated embodiment, HCT 160 is being used to configure adapter 130 for VoIP communications over provider network 110b.

2.0 Hardware Configuration Token

Figure 2:
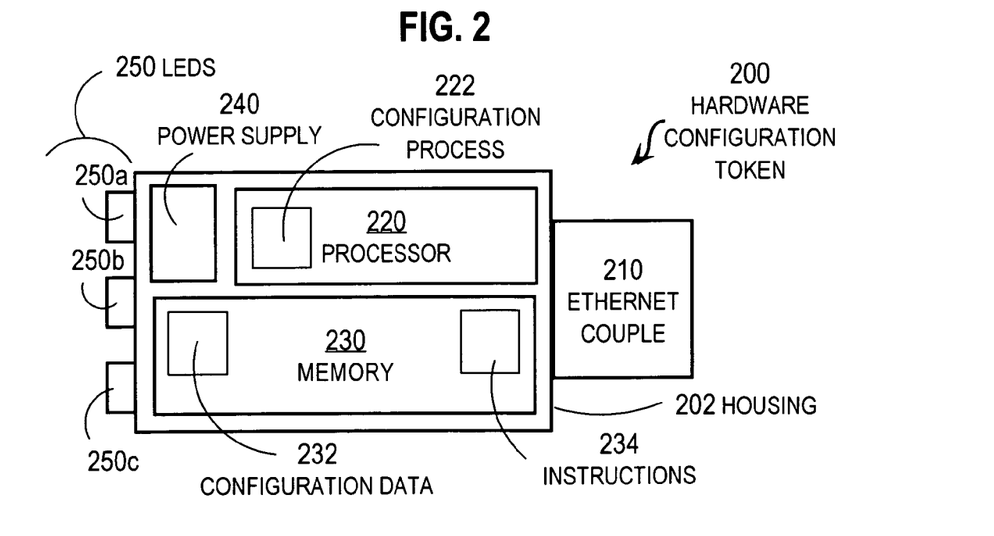
FIG. 2 is a block diagram that illustrates a hardware configuration device for a network appliance, according to an embodiment.

FIG. 2 is a block diagram that illustrates a hardware configuration device called herein a hardware configuration token (HCT) 200 for configuring a network appliance, according to an embodiment.

The HCT 200 includes a housing 202, an Ethernet couple 210, and three light-emitting diodes (LEDs) 250a, 250b, 250c, collectively referenced as LEDs 250, all visible externally. Inside housing 202 are included a programmable processor 220, a computer-readable medium serving as memory 230 and a power supply 240. The memory 230 holds data that includes configuration data 232 and instructions 234 for processor 220. A configuration process 222 executes on processor 220 based on the instructions 234 and configuration data 232. Also included but not depicted are other components of a computer system used in HCT 200 to control the LEDs 250, an Ethernet interface connected to Ethernet couple 210, and a data bus to exchange data among components. Such well-known components are described in more detail in a later section, with reference to a computer depicted in FIG. 4. For example, the LEDs 250 serve the function of display 414 of the computer depicted in FIG. 4, but input devices 412, 416 of the computer are not shown for HCT 200, and may be omitted in some embodiments.

In some embodiments, power supply 240 includes one or more batteries. In some embodiments, power is provided through Ethernet couple 210; and in various of these embodiments power supply 240 utilizes that source of power instead of, or in addition to, batteries. In various other embodiments, more or fewer LEDs 250, or other display or audio devices to indicate a state of the HCT, are included in HCT 200, and the same or more processors, processes, and memory components are included. Although configuration data 232 and instructions 234 are shown as integral blocks in contiguous portions of memory, in other embodiments the configuration data and instructions or portions thereof are stored in more or fewer contiguous portions of one or more memory components.

In some embodiments, the Ethernet couple 210 includes an adapter for a different physical port that is available on a particular appliance. For example, in an embodiment in which the appliance has a Universal Serial Bus (USB) port but not an Ethernet port, the Ethernet couple 210 includes an Ethernet-USB adapter. Similarly, in an embodiment in which the appliance has an Firewire port but not an Ethernet port, the Ethernet couple 210 includes an Ethernet-Firewire port adapter. A Firewire is an interface defined by the Institute of Electronics and Electrical Engineers (IEEE) as IEEE-1394 and described in Request For Comments (RFC) 2734 of the Internet Engineering Task Force (IETF). All IETF RFCs are available to the public in the rfc directory at the domain ietf.org of the World Wide Web. The entire contents of RFC 2734 are hereby incorporated by reference as if fully set forth herein. In some embodiments, other interfaces are utilized, such as an RS-232 serial port.

According to one embodiment, the HCT is programmed by a particular service provider with configuration data 232 specific to that provider and a particular subscriber. It is assumed for purposes of illustration that, before programming by the service provider, all three LEDs 250 illuminate (e.g., emitting a green light from LED 250*a*, a yellow light from LED 250*b* and a red light from LED 250*c*) when the HCT is powered. It is further assumed that, after programming by the service provider, the LED 250*b* alone illuminates (e.g., emitting a yellow light) when the HCT is powered. In this condition, at a subscriber site, the Ethernet couple 210 of the HCT 200 is plugged into the Ethernet port of a network appliance to be configured by the subscriber. After a successful configuration of the network appliance by the HCT, if any, the LED 250*a* alone illuminates (e.g., emitting a green light) when the HCT is powered. This is the expected result most of the time. After an unsuccessful configuration of the network appliance, if any, the LED 250*c* alone illuminates (e.g., emitting a red light) when the HCT is powered. In this case, which is expected to occur only a small fraction of the time, further remedial action is required of the subscriber or service provider or both. For example, the subscriber is instructed to power down the network appliance, check connections, and re-power the network appliance and then reinsert the HCT. If this does not suffice, a technician is then dispatched to the subscriber's site, as is routine in the more conventional approaches. In other embodiments, one or more different devices replace or augment LEDs 250 to indicate a state of configuration by the HCT.

According to some embodiments, an HCT is shipped to a subscriber at an appropriate time, such as when the subscriber purchases the network appliance and informs the service provider of the subscriber's intent to subscribe to the service. The shipping may be performed with any level of security that is appropriate, including default security for first class mail, or government or commercial delivery requiring a signature of a recipient.

Before or after the subscriber connects the network appliance to an edge node of the service provider network, using any procedures known at the time, the subscriber plugs the Ethernet couple of the HCT into an appropriate port on the network appliance. A network appliance typically has several ports including one or more Ethernet ports.

The HCT automatically configures the network appliance for communications with the service provider network by emulating a configuration data message produced manually by a human user, as described in more detail in the next section. Thus human involvement is largely bypassed.

The HCT is then removed from the network appliance and disposed of in any manner deemed appropriate by the service provider. For example, in some embodiments, the HCT is single use; and is useless after a successful configuration. Such an HCT is safely discarded after use. In some embodiments, the HCT is kept by the subscriber in a safe place for reuse as desired. For example, after an equipment failure and repair or replacement, the repaired or replaced network appliance is configured with the HCT. In some embodiments of these, the subscriber keeps the HCT in a secure place, like a key to a safe would be kept, and brings the HCT to a new location to configure an intermediate network device at the new location to provide service to the subscriber. The subscriber is properly motivated to keep the HCT safe because the subscriber is billed for all service rendered to a network appliance that uses the same configuration data. In some embodiments, the HCT is sent back to the service provider, again using any level of shipping security deemed appropriate. The provider then re-programs the HCT for use with a new network appliance procured by a different new subscriber.

The HCT may be programmed in any manner known in the art. In some embodiments, the HCT includes one or more additional ports used to program the HCT. In some embodiments, the instructions 234 run as configuration process 222 include instructions for a web server that accepts, stores and executes scripts or applets or other programs input from an external device, using Ethernet couple 210 as a network link.

The components of HCT shown and implied are each quite small, and the entire device, housing, LEDs and Ethernet couple can be made in a diminutive package, such as the size of a pen or door key. Small size is an advantage of a preferred embodiment but is not required.

In some embodiments, the HCT is used as a secure token so that a subscriber can reuse the HCT at any location of the subscriber-bearer's choosing. Additionally, there is nothing to limit the HCT from generating more secure data than constant passwords. For example, in some embodiments, the HCT produces one-time passwords. In various other embodiments, other cryptographic technology is implemented.

3.0 Method on Hardware Configuration Token

Figure 3A:
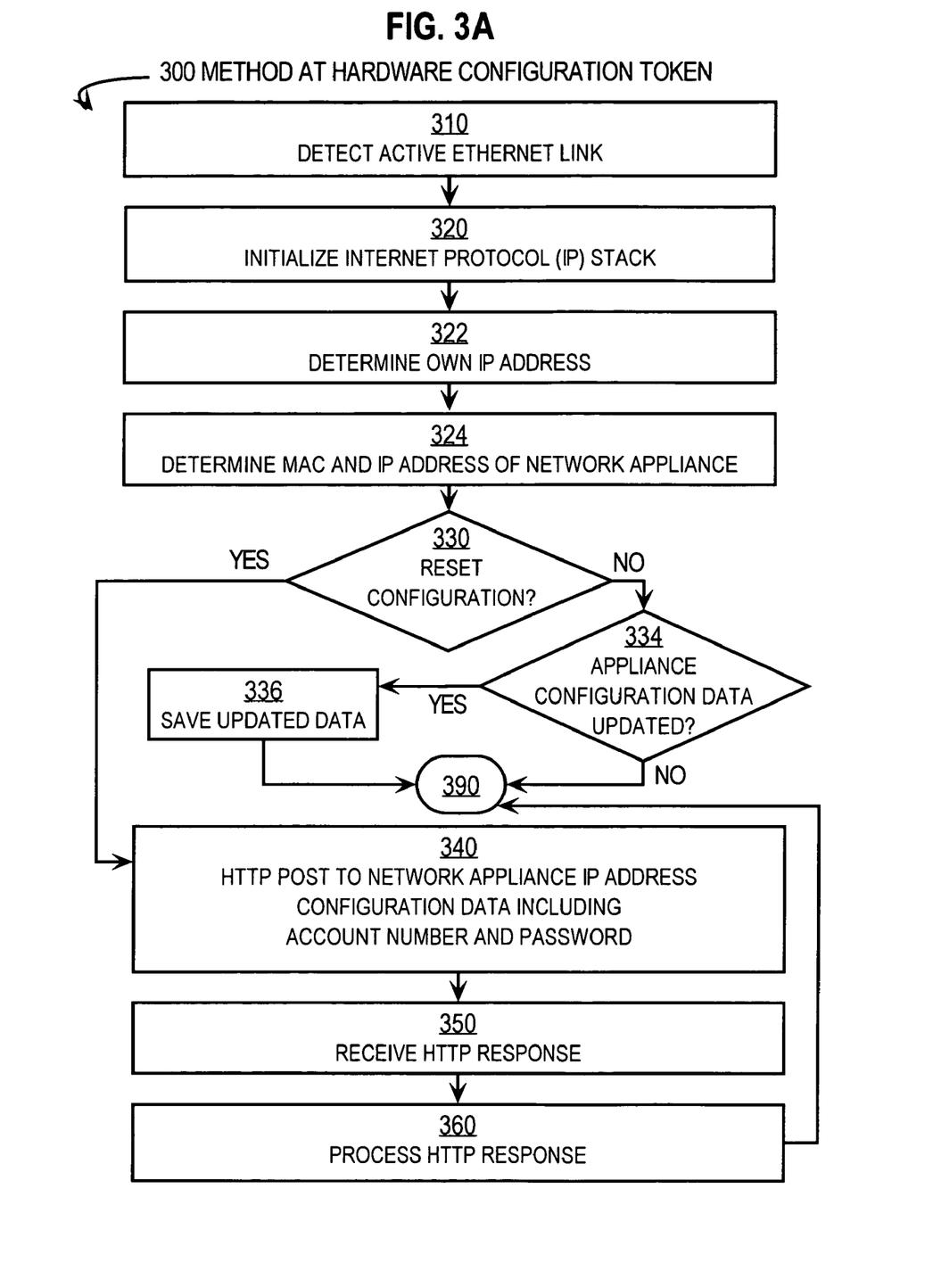
FIG. 3A is a flow diagram that illustrates a method on a hardware configuration device for configuring a separate network appliance, according to an embodiment.

FIG. 3A is a flow diagram that illustrates a method 300 on a hardware configuration device for configuring a separate network appliance, according to an embodiment. Although steps are shown in FIG. 3A and following flow diagrams in a particular order for purposes of illustration, in other embodiments one or more steps are performed in a different order or overlapping in time by one or more serial or parallel processes, or one or more steps are omitted, or the method 300 is changed in some combination of ways.

In step 310 an active Ethernet link with a network appliance is detected on Ethernet couple 210. Any method may be used to determine whether there is an active Ethernet logical link on Ethernet couple 210. In some embodiments, a layer 2 handshake involving a discovery message and an acknowledgement (ACK) message is used by a layer 2 process on the HCT to determine that an active Ethernet logical link has been detected. Until an active Ethernet logical link is detected, the HCT remains in an idle state. In some embodiments, the HCT includes steps to distinguish a physical link, e.g. a voltage within specifications, from a logical link, e.g., a layer 2 handshake involving discovery and acknowledgement messages. In some of these embodiments, a failure of either is indicated. For example one or more LEDs 250 are illuminated to indicate a physical failure or a logical failure.

In step 320 an IP stack is initialized. An IP stack is a portion of memory and instructions that process all headers up to and including an IP header in a data packet.

In step 322, the HCT determines an IP address for itself on the network formed by itself and the network appliance and any devices connected to the network appliance. Any method known in the art when the HCT is programmed may be used to perform this step. For example, if LAN 110*a* includes a Dynamic Host Configuration Protocol (DHCP) server, the DHCP server responds to a DHCP discovery message from the HCT with an offer that includes an IP address that the HCT can accept. DHCP is described in RFC 2131, the entire contents of which are hereby incorporated by reference as if fully set forth herein.

If LAN 110*a* does not include a DHCP server, the HCT can assign itself an IP address using the Automatic Private IP Addressing (APIPA) mechanism. APIPA is described in IETF RFC 3927, the entire contents of which are hereby incorporated by reference as if fully set forth herein.

In some embodiments, the HCT is able to configure an appliance without having an IP address, using a null address, and step 322 is omitted. In various embodiments, one or more LEDs 250 or other presentation components, such as display components or audio components, on housing 202 of HCT 200 are activated to indicate the HCT is in a particular state associated with discovering its own IP address.

In step 324, the Media Access Control (MAC) and IP addresses of the network appliance connected by Ethernet couple 210 are determined. Any method known in the art at the time the HCT is programmed may be used. For example, the IP Reverse Address Resolution Protocol (RARP) is used in some embodiments to determine the IP address of a neighboring network node, i.e., the network appliance connected to Ethernet couple 210. RARP is described in IETF RFC 903, the entire contents of which are hereby incorporated by reference as if fully set forth herein.

The MAC address is a unique number assigned by convention among network device manufacturers to each device on a network. The MAC address is included in a layer 2 header in the IP data packet and processed by a layer 2 process in the IP stack. Thus the MAC address is available in all IP data packets received from the network appliance, including any in response to RARP. In some embodiments the HCT has configuration data for multiple different appliances, and the different configuration data is associated with different MAC addresses. In these embodiments, the MAC address of the appliance actually connected to Ethernet couple 210 is used to determine what configuration data to send to the connected appliance.

In some embodiments, the HCT is able to configure an appliance without knowing the IP address of the network appliance, using one or more broadcast messages, so the IP address of the appliance is not determined in step 324. In some embodiments, the MAC address is not used because only one configuration data set is to be sent; and the MAC address is not determined during step 324. In some embodiments neither the IP address nor the MAC address of the network appliance is used; and step 324 is omitted. In various embodiments, one or more LEDs 250 or other presentation components on housing 202 of HCT 200 are activated to indicate the HCT is in a particular state associated with discovering the IP or MAC address of the appliance, or both.

In some embodiments, control passes directly to step 340 after one or more of steps 310, 320, 322, 324. In step 340 the configuration data is sent through the Ethernet couple 210 into the appliance in a manner expected by the appliance. The appliance expects the configuration data is directed to an application layer (layer 7) program executing on the appliance and identified by a particular well-known logical port number in a transport (layer 4) protocol header for an established standard protocol in an IP payload. Well-known established standard layer 4 protocols include the Transmission Control Protocol (TCP) and the User Datagram Protocol (UDP). TCP and UDP are described in IETF RFC 761 and RFC 768, respectively, the entire contents of each of which are hereby incorporated by reference as if fully set forth herein. The layer 7 application expects the data to arrive formatted in a particular well-known message form. Thus during step 340, the HCT transmits an IP data packet with the TCP port indicating the well-known port and the layer 7 data in the TCP payload formatted in the well-known form associated with that application.

A widely used application layer (layer 7) protocol is the Hypertext Transfer Protocol (HTTP) which is used to access and transport data files (called documents) that may have links to other documents, such as Hypertext Markup Language (HTML) documents commonly known as Web pages. HTTP version 1.1 (HTTP 1.1) is described at the time of this writing in IETF RFC 2616, the entire contents of which are hereby incorporated by reference as if fully set forth herein.

Any document that may be transferred using HTTP is an HTTP resource. HTTP resources include Web pages, text, audio, images and video. A resource is transmitted using HTTP from an HTTP server (often called a Web server) to an HTTP client (often called a Web browser, or, simply, browser) in response to a request from the HTTP client. The well known port for HTTP is 80.

Many network appliances, including network appliances of CISCO SYSTEMS™, Inc. of San Jose, Calif., use an HTTP server to send web pages to a browser on a user's computer to prompt a human user for configuration data and to receive the configuration data input by the human user and returned by the browser as an HTTP response. In an illustrated embodiment, the browser uses an HTTP POST command to return the configuration data. The well-known form of the response is therefore an HTTP response, such as an HTTP POST.

Thus, in embodiments in which the network appliance uses an HTTP server, the HCT 200 sends an HTTP POST command with configuration data 232 to port 80 through Ethernet couple 210 during step 340. The HTTP POST includes the configuration data 232, for example, the account number and password assigned by the service provider for the subscriber to whom the HCT 200 was shipped.

In some embodiments, step 340 pre-empts the need for an HTTP client to request the HTTP server for the web page that prompts a human user, and, instead, sends an HTTP POST with the configuration data 232 in a first message. In some embodiments, the HTTP client on the HCT sends both a request for the web page and the response as a post. In either case, the human input is bypassed, and the configuration data comes directly from the memory 230 on the HCT 200, without human intervention or error. In some embodiments, during step 340, the HCT accesses a server in the provider network 110*b* to determine configuration data to send to the appliance in an HTTP POST.

In some embodiments, it is possible to have the HCT 200 learn of manual updates to the configuration data on a network appliance. Manual updates can occur for any number of reasons after the appliance is originally installed and configured. For example, a service provider might determine that a particular password is compromised and issue a new password. In some embodiments, the account number and password are not changed but some other change is made, such as a change to the quality of service subscribed to. If the human subscriber or technician has made the change directly on the appliance, the configuration data 232 on the HCT 200 is stale. In such embodiments, it is useful to have an option for the HCT 200 to learn the updated configuration data from the appliance. Then, if the appliance is repaired or replaced, the HCT can still be used to configure the repaired or replaced appliance with the updated configuration data. Step 330, step 334 and step 336 are directed to learning the configuration data updates from the appliance. Of course, in some embodiments, the configuration change is implemented by sending a new or re-programmed HCT to the subscriber site 102; and step 330, step 334 and step 336 are omitted.

In step 330, it is determined whether any configuration data already on the appliance is to be reset. This occurs in some embodiments; for example, when the appliance has been configured badly for any reason, and the configuration data 232 on the HCT 200 is considered superior to any data already on the appliance, however recent. If it is determined in step 330 to reset the configuration on the appliance, control passes to step 340, described above, to send the configuration data in a well-known form to a well-known port on the appliance. If it is determined in step 330, not to reset the configuration, control passes to step 334, described below.

Any number of approaches may be used to perform step 330. For example, in some embodiments, the HCT provides a web interface to a computer connected to Ethernet couple 210 through which the configuration process 222 is instructed to extract the current configuration from the appliance. In some embodiments, the HCT provides a process that runs in a background, called a "daemon," which listens on a TCP or UDP port for instructions to extract the current configuration from the appliance. In some embodiments, a button or switch on the HCT is activated to trigger the extraction process. In various embodiments, one or more LEDs 250 or other presentation components on housing 202 of HCT 200 are activated to indicate the HCT is in a learning mode. For example, in some embodiments, LED 250b is intermittently activated to cause a blinking yellow light to indicate the HCT is learning configuration data from the appliance.

If it is determined in step 330 to not reset the configuration data, then the HCT learns the configuration from the appliance, and control passes to step 334. In step 334, it is determined whether the configuration data on the appliance has been updated since the HCT was programmed. Any method may be used. For example, in some embodiments, the configuration data 232 on the HCT 200 includes a date when the configuration data was determined. Similarly, the configuration data on the appliance includes a date when it was determined. If the date on the appliance is later than the date in the HCT, then it is determined in step 334 that the appliance configuration has been updated.

In some embodiments, the HCT is left connected to the appliance and snoops manually input messages entered on the appliance to update the configuration data. After such a message is snooped, it is determined in step 334 that the appliance configuration data has been updated.

In some embodiments configuration data on the appliance is learned regardless of whether it has been updated. In such embodiments, step 334 is omitted.

If it is determined in step 334, that the configuration data has not been updated since being configured by the HCT, then control passes to step 390 to end the process. In various embodiments, one or more LEDs 250 or other presentation components on housing 202 of HCT 200 are activated to indicate the HCT is in a particular state associated with termination of the learning process.

If it is determined in step 334, that the configuration data has been updated since being configured by the HCT, then control passes to step 336. In step 336, the updated configuration data on the appliance is retrieved and stored as configuration data 232 in memory 230 on HCT 200. Control then passes to step 390 to end the process. In various embodiments, one or more LEDs 250 or other presentation components on housing 202 of HCT 200 are activated to indicate the HCT is in a particular state associated with updating its configuration data based on configuration data learned from the appliance.

In some embodiments, the methods employed to extract the configuration data from the appliance do not require modification or knowledge of the process by the appliance.

In various embodiments, after the configuration data is sent in the well-known form to the well known port, the HCT activates one or more LEDs 250 or other presentation components to indicate successful configuration, e.g., the HCT 200 activates LED 250a to emit a green light. However, in some embodiments, the HCT waits for an IP data packet from the appliance with a response message that indicates successful service, e.g., successful access to provider network 100. Such embodiments include step 350 to receive a response from the well-known port. In the illustrated embodiment, step 350 includes receiving one or more HTTP response messages from the HTTP server on the appliance.

In step 360, the HCT 200 processes the HTTP response from the HTTP server on the appliance. Based on the response, the HCT indicates success or failure of the configuration. For example, in some embodiments the HCT activates LED 250a (e.g., to emit a green light) when the response indicates success and the HCT activates LED 250c (e.g., to emit a red light) when the response indicates failure.

Figure 3B:
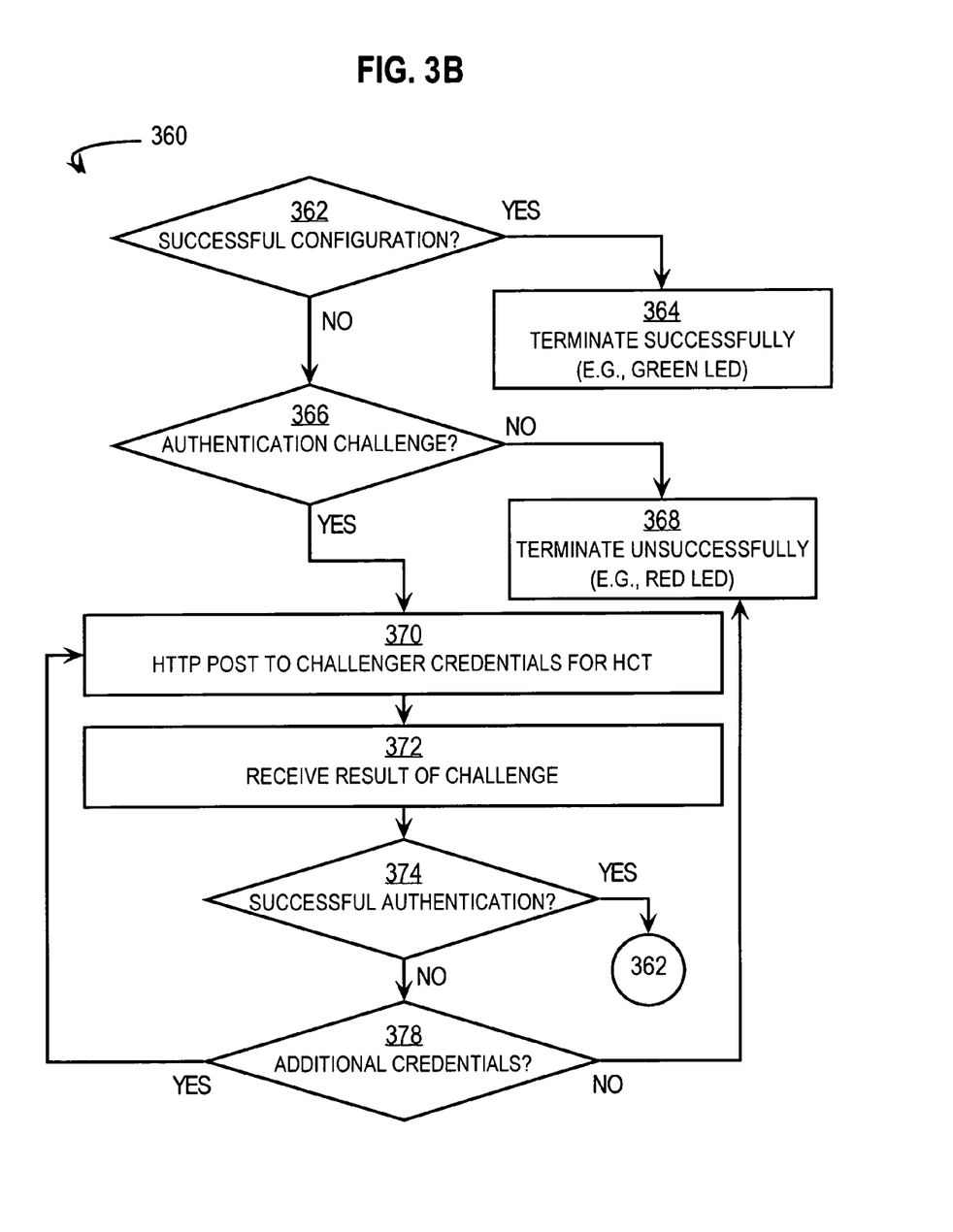
FIG. 3B is a flow diagram that illustrates in more detail a step of the method of FIG. 3A, according to an embodiment.

FIG. 3B is a flow diagram that illustrates in more detail a step 360 of the method 300 of FIG. 3A, according to an embodiment. According to this embodiment, step 360 includes steps 362 through step 378.

In step 362, it is determined whether an HTTP response from the HTTP server on the appliance indicates successful configuration, e.g., access to the provider network 110b. If so, then control passes to step 364. In some embodiments, during step 362, the HCT accesses a server in the Provider network 110b to determine whether configuration is successful.

In step 364, the configuration process 222 terminates successfully. For example, the process 222 cause a particular LED (e.g., LED 250a) to emit light (e.g., a green light) while the HCT is powered. In other embodiments, other presentation components are activated to indicate successful configuration.

If it is determined, in step 362, that the HTTP response from the HTTP server on the appliance does not indicate successful configuration, then control passes to step 366. In step 366, it is determined whether an HTTP response received through the Ethernet couple with the appliance indicates an authentication challenge, such as from a RADIUS server on provider network 110b or a gateway server on an edge of provider network 110b. If not, then it is assumed that configuration has failed and control passes to step 368.

In step 368, the configuration process 222 terminates unsuccessfully. For example, the process 222 cause a particular LED (e.g., LED 250c) to emit light (e.g., a red light) while the HCT is powered. In other embodiments, other presentation components are activated to indicate unsuccessful configuration If it is determined, in step 366, that an HTTP response from the appliance indicates an authentication challenge, then control passes to step 370. In some embodiments, the configuration data 232 on the memory 230 of HCT 200 includes one or more sets of credentials for the appliance based on information received from the service provider. In some embodiments, a set of credentials includes a second password with or without additional information. For some embodiments, credentials for authentication are as described in RFC 2510, "Internet X.509 Public Key Infrastructure Certificate Management Protocols," the entire contents of which are hereby incorporated by reference as if fully set forth herein. In step 370, the configuration process 222 on HCT 200 sends a first set of credentials in an HTTP POST to the HTTP server through Ethernet couple 210. The HTTP server on the appliance then responds to the challenge based on the credentials received in the POST. In various embodiments, one or more LEDs 250 or other presentation components on housing 202 of HCT 200 are activated to indicate the HCT is responding to an authentication challenge.

In step 372 an HTTP message including a result of the response to the challenge is received, and control passes to step 374. In step 374, it is determined whether the result indicates successful authentication. If so, control passes to step 362, described above, to determine if configuration is successful. If not, control passes to step 378.

In step 378, it is determined whether there are any additional sets of credentials that can be tried. In some embodiments, the configuration data 232 on memory 230 of HCT 200 includes several sets of credentials. If at least one set of credentials have not yet been tried, then it is determined during step 378 that there are additional credentials. If it is determined in step 378 that there are no additional sets of credentials to try, then control passes to step 368, described above, for termination with unsuccessful configuration.

If it is determined in step 378 that there is an additional set of credentials to try, then control passes back to step 370. In step 370 the next set of credentials is sent in an HTTP POST to the network appliance. Step 370, step 372, step 374 and step 378 form a loop that is repeated until a successful authentication or until the last set of credentials are sent and found unsuccessful, whichever occurs first. In various embodiments, one or more LEDs 250 or other presentation components on housing 202 of HCT 200 are activated to indicate the HCT is in a particular state associated with trying a particular set of credentials in response to an authentication challenge.

Using the method 300, an appliance, such as a network appliance like a VoIP adapter, is configured by having a human user simply plug a small hardware configuration device into a physical interface port on the appliance. The device can be removed and either discarded, saved or returned, after it completes its task as indicated by one or more presentation components on the device, such as LEDs. No further knowledge or data entry is required of the human user.

Furthermore, in many embodiments, the well-known port and well-known form are selected to match those already supported by the appliance. In such embodiments, no change is required in either the software or the hardware of the appliance.

4.0 Implementation Mechanisms—Hardware Overview

Figure 4:
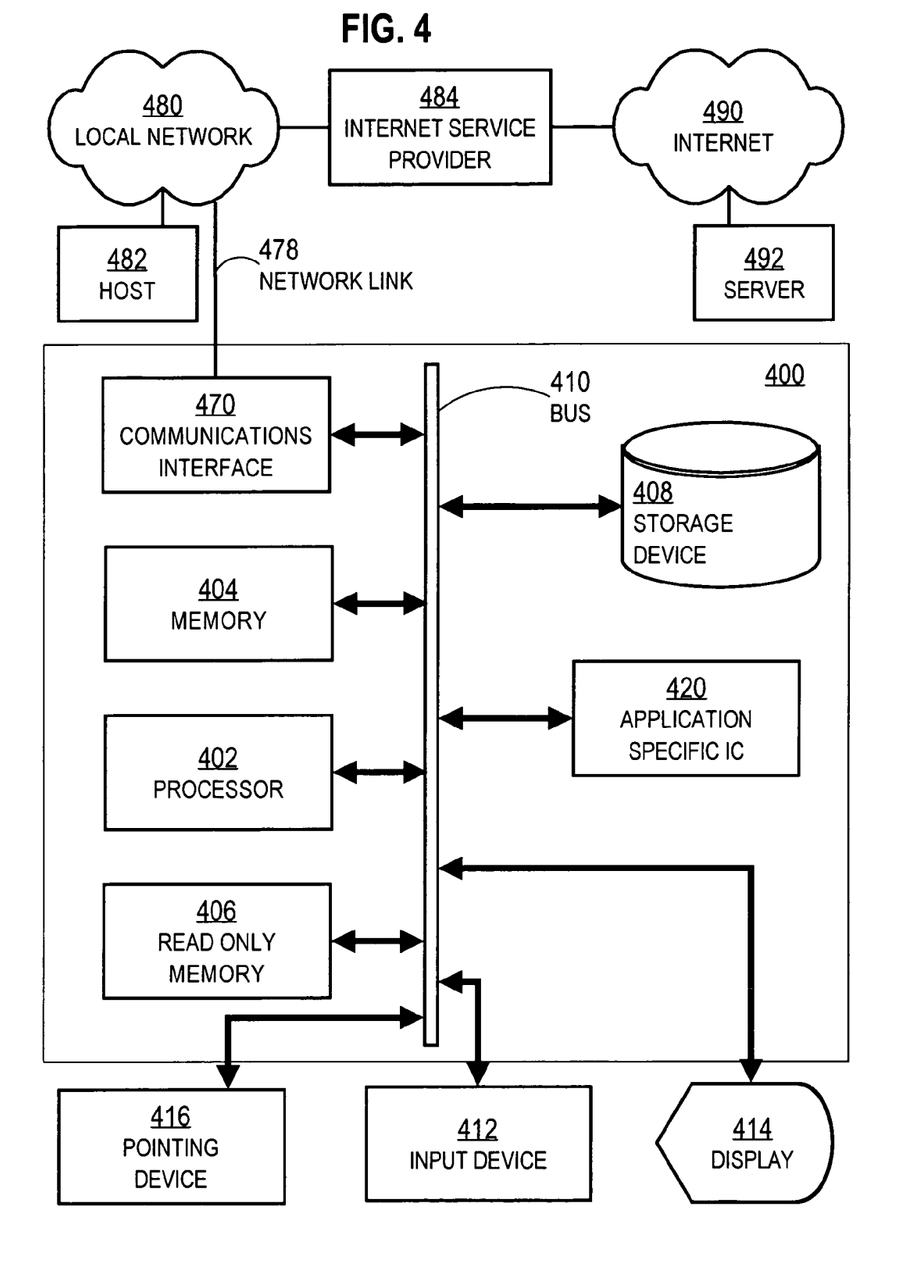
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, which carry information to and from computer system 400, are exemplary forms of carrier waves. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

automatically determining when a hardware token device is directly connected to a network appliance implementing a Hypertext Transfer Protocol (HTTP) server application, wherein the hardware token device is configured to store configuration data for providing the network appliance access to a network controlled by a service provider;

automatically sending, from the hardware token device, an Internet Protocol (IP) data packet to the HTTP server application of the network appliance, wherein the network appliance is configured to utilize at least a portion of the configuration data included in the received IP data packet to attempt to gain access to the network controlled by the service provider;

receiving, with the hardware token device, a response data packet from the network appliance, wherein the response data packet indicates to the hardware token device whether the network appliance was provided access to the network according to the configuration data; and when the response data packet indicates the network appliance was not provided access to the network due to a challenge to an authentication of the network appliance, sending, from the hardware token device, another IP data packet that includes additional configuration data, wherein the network appliance is configured to attempt to gain access to the network with the additional configuration data, and wherein the network appliance is configured to indicate to the hardware token device whether the network appliance was provided access to the network with the additional configuration data.

2. The method of claim 1, further comprises:
identifying a Media Access Control (MAC) address of the network appliance, wherein the hardware token device is configured to store configuration data for multiple devices that are indexed based on corresponding MAC addresses;
determining which configuration data corresponds to the network appliance based on the identified MAC address; and
automatically sending, from the hardware token device, the IP data packet including the configuration data determined to correspond to the network appliance based on the identified MAC address.

3. The method of claim 1, further comprises:
identifying, with the hardware token device, that the network appliance was previously configured with configuration data; and
determining, with the hardware token device, whether to reset the network appliance with the configuration data stored in the hardware token device based on a current configuration of the network appliance.

4. The method of claim 1, further comprises:
extracting, with the hardware token device, the current configuration of the network appliance;
determining, with the hardware token device, whether the current configuration of the network appliance is an updated version of the configuration data stored on the hardware token device; and
deciding whether to reset the current configuration of the network appliance with the configuration data stored by the hardware token device based on whether the current configuration is the updated version.

5. The method of claim 4, wherein the determining, with the hardware token device, of the current configuration of the network appliance is the updated version is performed by comparing a date associated with the current configuration of the network appliance to a date associated with the configuration data stored by the hardware token device.

6. The method of claim 4, further comprises updating the configuration data stored on the hardware token device with the current configuration of the network appliance when the current configuration of the network appliance is the updated version.

7. The method of claim 1, further comprises receiving, with the hardware token device, another response data packet from the network appliance, wherein the response data packet indicates to the hardware token device whether the network appliance was provided access to the network with the additional configuration data.

8. The method of claim 1, wherein the network appliance is configured to receive the IP data packet from the hardware token device through a logical port, wherein the logical port is port 80 for the HTTP server application, and wherein the IP data packet is configured in an HTTP POST user message format.

9. The method of claim 1, further comprises:
determining, with the hardware token device, an IP address for the network appliance; and
sending, from the hardware token device, the IP data packet to the network appliance corresponding to the IP address, wherein the IP data packet has a null address corresponding to the hardware token device.

10. A hardware token device including a computer-readable memory to store instructions that, when executed by a processing system, cause the processing system to:
determine when a hardware token device is directly connected to a network appliance implementing a Hypertext Transfer Protocol (HTTP) server application, wherein the hardware token device is configured to store configuration data for providing the network appliance access to a network controlled by a service provider;
send, from the hardware token device, an Internet Protocol (IP) data packet to the HTTP server application of the network appliance, wherein the network appliance is configured to utilize at least a portion of the configuration data included in the received IP data packet to attempt to gain access to the network controlled by the service provider;
receive, with the hardware token device, a response data packet from the network appliance, wherein the response data packet indicates to the hardware token device whether the network appliance was provided access to the network according to the configuration data; and
send, from the hardware token device, another IP data packet that includes additional configuration data when the response data packet indicates the network appliance was not provided access to the network due to a challenge to an authentication of the network appliance, wherein the network appliance is configured to attempt to gain access to the network with the additional configuration data, and wherein the network appliance is configured to indicate to the hardware token device whether the network appliance was provided access to the network with the additional configuration data.

11. The hardware token device of claim 10, wherein the instructions, when executed by the processing system, further cause the processing system to:
identify a Media Access Control (MAC) address of the network appliance, wherein the hardware token device is configured to store configuration data for multiple devices that are indexed based on corresponding MAC addresses;
determine which configuration data corresponds to the network appliance based on the identified MAC address; and
send, from the hardware token device, the IP data packet including the configuration data determined to correspond to the network appliance based on the identified MAC address.

12. The hardware token device of claim 10, wherein the instructions, when executed by the processing system, further cause the processing system to:
identify, with the hardware token device, that the network appliance was previously configured with configuration data; and
determine, with the hardware token device, whether to reset the network appliance with the configuration data stored in the hardware token device based on a current configuration of the network appliance.

13. The hardware token device of claim 10, wherein the instructions, when executed by the processing system, further cause the processing system to:
extract, with the hardware token device, the current configuration of the network appliance;
determine, with the hardware token device, whether the current configuration of the network appliance is an updated version of the configuration data stored on the hardware token device; and
decide whether to reset the current configuration of the network appliance with the configuration data stored by the hardware token device based on whether the current configuration is the updated version.

14. The hardware token device of claim 13, wherein the instructions, when executed by the processing system, further cause the processing system to determine, with the hardware token device, the current configuration of the network appliance is the updated version by comparing a date associated with the current configuration of the network appliance to a date associated with the configuration data stored by the hardware token device.

15. The hardware token device of claim 13, wherein the instructions, when executed by the processing system, further cause the processing system to update the configuration data stored on the hardware token device with the current configuration of the network appliance when the current configuration of the network appliance is the updated version.

16. The hardware token device of claim 10, wherein the instructions, when executed by the processing system, further cause the processing system to: receive, with the hardware token device, another response data packet from the network appliance, wherein the response data packet indicates to the hardware token device whether the network appliance was provided access to the network with the additional configuration data.

17. The hardware token device of claim 10, wherein the network appliance is configured to receive the IP data packet from the hardware token device through a logical port, wherein the logical port is port 80 for the HTTP server application, and wherein the IP data packet is configured in an HTTP POST user message format.

18. The hardware token device of claim 10, wherein the instructions, when executed by the processing system, further cause the processing system to
determine, with the hardware token device, an IP address for the network appliance; and
send, from the hardware token device, the IP data packet to the network appliance corresponding to the IP address, wherein the IP data packet has a null address corresponding to the hardware token device.

19. A system comprising:
means for determining when a hardware token device is directly connected to a network appliance implementing a Hypertext Transfer Protocol (HTTP) server application, wherein the hardware token device is configured to store configuration data for providing the network appliance access to a network controlled by a service provider;
means for sending, from the hardware token device, an Internet Protocol (IP) data packet to the HTTP server application of the network appliance, wherein the network appliance is configured to utilize at least a portion of the configuration data included in the received IP data packet to attempt to gain access to the network controlled by the service provider; and
means for receiving a response data packet from the network appliance, wherein the response data packet indicates to the hardware token device whether the network appliance was provided access to the network according to the configuration data, wherein the means for sending is configured to send, from the hardware token device, another IP data packet that includes additional configuration data when the response data packet indicates the network appliance was not provided access to the network due to a challenge to an authentication of the network appliance, wherein the network appliance is configured to attempt to gain access to the network with the additional configuration data, and wherein the network appliance is configured to indicate to the hardware token device whether the network appliance was provided access to the network with the additional configuration data.

20. The system of claim 19, further comprises:
means for identifying a Media Access Control (MAC) address of the network appliance, wherein the hardware token device is configured to store configuration data for multiple devices that are indexed based on corresponding MAC addresses;
means for determining which configuration data corresponds to the network appliance based on the identified MAC address; and
means for automatically sending, from the hardware token device, the IP data packet including the configuration data determined to correspond to the network appliance based on the identified MAC address.

21. The system of claim 19, further comprises:
means for identifying, with the hardware token device, that the network appliance was previously configured with configuration data; and
means for determining, with the hardware token device, whether to reset the network appliance with the configuration data stored in the hardware token device based on a current configuration of the network appliance.

22. The system of claim 19, further comprises:
means for extracting, with the hardware token device, the current configuration of the network appliance;
means for determining, with the hardware token device, whether the current configuration of the network appliance is an updated version of the configuration data stored on the hardware token device; and
means for deciding whether to reset the current configuration of the network appliance with the configuration data stored by the hardware token device based on whether the current configuration is the updated version.

23. The system of claim 22, wherein the means for determining, with the hardware token device, the current configuration of the network appliance is the updated version includes means for comparing a date associated with the current configuration of the network appliance to a date associated with the configuration data stored by the hardware token device.

24. The system of claim 22, further comprises means for updating the configuration data stored on the hardware token device with the current configuration of the network appliance when the current configuration of the network appliance is the updated version.

25. The system of claim 19, wherein the means for receiving is configured to receive another response data packet from the network appliance, wherein the response data packet indicates to the hardware token device whether the network appliance was provided access to the network with the additional configuration data.

26. The system of claim 19, wherein the network appliance is configured to receive the IP data packet from the hardware token device through a logical port, wherein the logical port is port 80 for the HTTP server application, and wherein the IP data packet is configured in an HTTP POST user message format.

27. The system of claim 19, further comprises:
means for determining, with the hardware token device, an IP address for the network appliance; and
means for sending, from the hardware token device, the IP data packet to the network appliance corresponding to the IP address, wherein the IP data packet has a null address corresponding to the hardware token device.

* * * * *

UNITED STATES PATENT AND TRADEMARK OFFICE
CERTIFICATE OF CORRECTION

| | | |
|---|---|---|
| PATENT NO. | : 7,751,339 B2 | Page 1 of 1 |
| APPLICATION NO. | : 11/437930 | |
| DATED | : July 6, 2010 | |
| INVENTOR(S) | : Melton et al. | |

It is certified that error appears in the above-identified patent and that said Letters Patent is hereby corrected as shown below:

Column 19, line 17            In Claim 16, delete "to:" and insert -- to --, therefor.

Signed and Sealed this

Thirty-first Day of May, 2011

David J. Kappos
*Director of the United States Patent and Trademark Office*